# 2,790,703

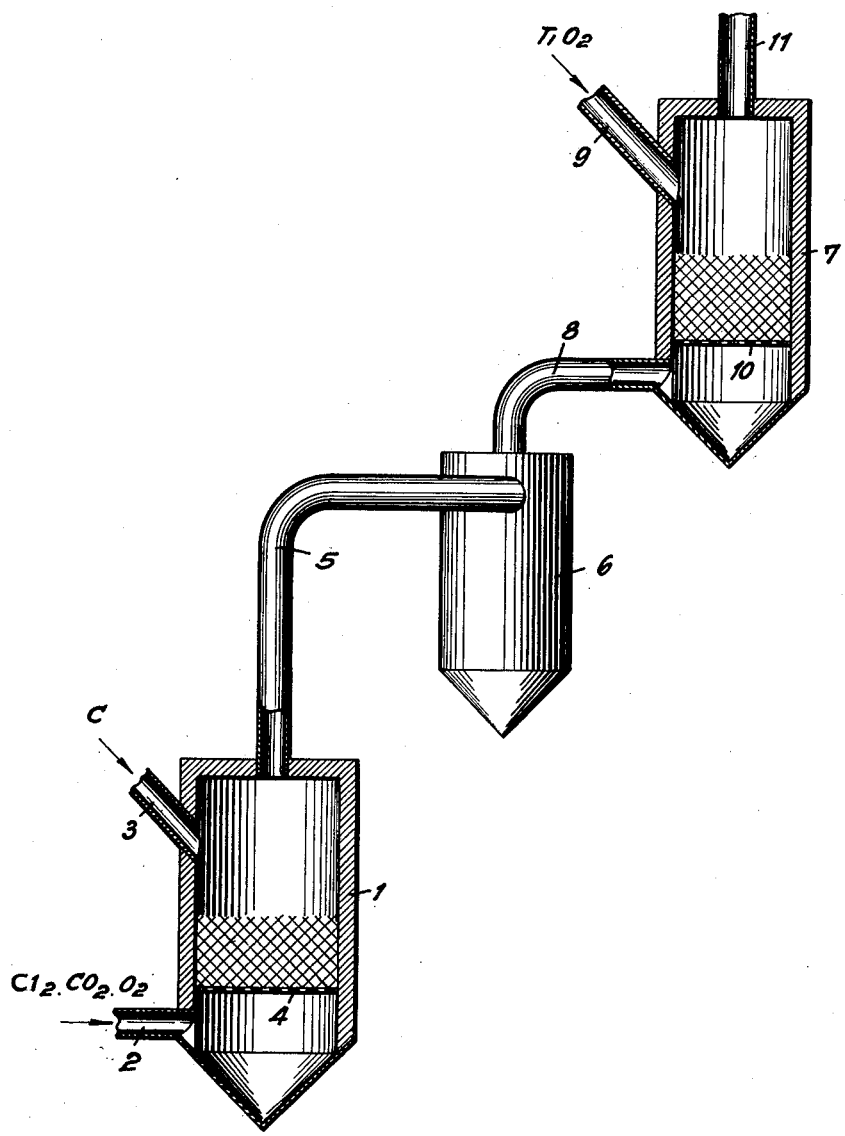

PROCESS FOR THE PRODUCTION OF TITANIUM TETRACHLORIDE

Walter Frey, Basel, Switzerland, assignor, by mesne assignments, to Fabriques de Produits Chimiques de Thann et de Mulhouse, Thann (Haut-Rhine), France, a corporation of France Application July 19, 1952, Serial No. 299,809

Claims priority, application Switzerland August 3, 1951

4 Claims. (Cl. 23—87)

The present invention relates to a process for the production of titanium tetrachloride by high temperature chlorination of titanium oxide bearing raw material with gaseous mixtures containing carbon monoxide and chlorine.

Generally titanium tetrachloride is produced by reacting titanium oxide raw materials together with chlorine and a reducing agent. Most of the prior processes use as reducing agents solid carbon containing substances, such as coke, charcoal, petroleum coke etc. The chlorination thereby proceeds according to the following reactions:

$$TiO_2 + 2C + 2Cl_2 = TiCl_4 + 2CO \quad (1)$$

and $$TiO_2 + C + 2Cl_2 = TiCl_4 + CO_2 \quad (2)$$

The chlorination gases therefore contain besides titanium tetrachloride vapor as gaseous constituents primarily carbon monoxide and carbon dioxide. The ratio of CO to $CO_2$ formed according to Reaction 1 or 2 depends predominately upon the reaction temperature but also on other reaction conditions, such as gas velocity, bed height etc. From Equations 1 and 2 can be seen that the two reactions need different amounts of carbon for the reduction of the titanium dioxide.

Due to the many variables influencing the percentage to which the chlorination follows the two reactions 1 and 2, it is impossible to adjust the ratio of $TiO_2$ to carbon within the charge exactly so that both of the two solid components are consumed completely at any place of the reaction zone. Therefore considerable amounts of unreacted material, either carbon or titanium oxide or mixtures thereof leave the reaction zone in form of ash. Roughly about 10% by weight of the charge has to be withdrawn in form of ash.

Another known chemically different method of chlorinating titanium oxide bearing materials, which uses carbon monoxide as reducing material instead of solid carbon, theoretically should avoid the mentioned difficulties and the formation of ash. But it has not yet been performed successfully on an industrial scale, primarily because of the much lower chlorination velocity of chlorine in mixture with carbon monoxide. It has been tried to increase the chlorination velocity by addition of solid carbon to the titanium material. However, the acceleration attained thereby is still not sufficient for the industrial realization of the process. Increase in temperature in order to accelerate the reaction also has proved impossible because the titanium oxide material exerts strong clogging and agglomerating tendencies at the temperatures needed for such acceleration. Therefore industrial chlorination of $TiO_2$ with CO and $Cl_2$ in absence of solid carbon in spite of the great advantages has heretofore been considered impossible for the reasons stated.

It has now been found that titanium oxide containing raw material can be chlorinated continuously without addition of solid carbon or other solid reducing agent by direct reaction with a gaseous mixture containing CO and $Cl_2$ with a high percentage utilization of the chlorine and with a reaction velocity satisfying industrial requirements by reacting the sandy or pulverulent titanium oxide containing raw material in gaseous suspension of the stream of chlorine and carbon monoxide. Thereby it is useful to maintain the sandy or pulverulent titanium oxide raw material in suspension by a gas stream being conducted with sufficient velocity in upward direction.

Thereby the following reaction takes place:

$$TiO_2 + 2CO + 2Cl_2 = TiCl_4 + 2CO_2 \quad (3)$$

This reaction produces by far the highest amount of heat of all 3 chlorination reactions mentioned: According to Reaction 1 about 2,000 cal., according to Reaction 2 about 43,000 cal. and according to Reaction 3 about 84,000 cal. are obtained by the chlorination of 1 mol $TiO_2$. In order to get the complete heat developed by Reaction 3 it is essential, as has surprisingly been found, that the reaction of the titanium oxide containing raw material maintained in suspension is performed without addition of solid carbon. It is believed that added solid carbon reacts with previously formed carbon dioxide to carbon monoxide under withdrawal of a great amount of heat. Thereby the temperature locally is reduced to such a low level that carbon monoxide cannot react any more. As the titanium oxide raw material maintained in suspension and forming a fluid bed offers a large surface to the attacking gas mixture and thereby rapidly reacts, sufficient heat is developed by Reaction 3 to attain without any further means the high reaction temperatures needed for chlorination by a gas mixture consisting of carbon monoxide and chlorine.

It is an important feature of this invention to carefully control the temperature within the suspended and agitated bed. The minimum reaction temperature for a rate of chlorination industrially feasible depends on the kind of raw material. Whereas material which is more easily attacked by chlorine, such as ilmenite, requires somewhat lower temperature than other material, such as rutile, the reaction temperatures should be maintained in any case above about 1000° C., preferably between 1100 and 1200° C. An upper limit of temperature is set primarily by the corrosion resistance of the furnace lining and lies at about 1300° C., if refractories with good resistance to chlorine are used.

Although the clogging and agglomerating tendencies of titanium material at these temperatures are very considerable, surprisingly no agglomeration of the sandy and pulverulent material is observed as long as the bed is maintained in continuous agitation by the gas stream. The clogging tendency can further be considerably lowered by using material of a definite grain size. Whereas a sufficient rate of reaction may be obtained with a material the major part of which (i. e. more than 90%) passes a sieve of 10 mesh and has a grain size of from 10 to 80 mesh, a more rapid chlorination is obtained by using materials of the preferred size range of from 80 to 200 mesh. With higher finess the clogging tendencies are getting much stronger. However, also considerable finer materials are not excluded from utilization, if special care is taken to prevent clogging. A dilution of the chlorination gases by an inert gas, e. g. nitrogen or carbon dioxide, may be useful for such a purpose. If a chlorination gas containing about 1 volume of inert gas and 1 volume of $Cl_2$—CO mixture is applied, also a raw material having a particle size of less than 200 mesh, e. g. of about 300 mesh, may be used. The dilution of the gases seems to effect also a dilution of the suspended bed of the raw material and seems to result in a more even development of heat within the bed. If a dilution of the chlorination gas is desired because of the mentioned reason or other, preferably a chlorination tail gas, after the condensation of the TiCl₄, may be used and recycled for this purpose.

A special advantage of this invention is that it contemplates also and primarily chlorinating titanium slags, such as they are obtained by beneficiation processes of ilmenite like iron ores. Such materials contain besides titanium oxide and iron oxide considerable amounts of the oxides of the alkaline earth metals, especially of Mg and Ca. A special object of the invention therefore is to present a method for the chlorination of such raw materials containing between 1 to 10% by weight of oxides of the alkaline earth metals including magnesium.

These oxides of Mg and Ca are the source of the following considerable difficulties in the prior chlorination processes: In part the oxides are chlorinated, in part they are left unchanged within the reaction zone and have to be withdrawn in form of ash. The chlorides however formed in part and being in the molten state at the temperatures of the chlorination always cause the bed of raw material, e. g. the briquettes to clog and to plug necessitating thereby frequent interruptions of the operation.

It has now been found that with the method of the invention and at the temperatures of chlorination maintained the oxides of magnesium and calcium are not only substantially completely chlorinated but also volatilized and distilled off as chlorides. In distinction to the previous chlorination methods therefore the chlorination may be performed in such a way that the raw material is substantially completely chlorinated and volatilized so that practically no ash is formed and remains within the reaction zone. The conditions (primarily the velocity of the gases) can furthermore be controlled in such a way that the very small amount of gangue and similar material (consisting predominately of silica and silicates) which is not or not completely chlorinated and not volatilized is carried away as flue dust by the reaction gases. To get the full advantage of the invention it is therefore essential to control the chlorination reaction that no solid residue is formed and kept back in the suspended agitated bed.

The velocity of the chlorination gases, i. e. the gases containing CO and Cl₂, calculated on the free cross section of the chlorination zone has to be at least as high that the raw material is maintained in suspension. Preferably the velocities are maintained substantially higher than the lower limit for the formation of the solid suspension in order to maintain within the bed a pronounced agitation, such as a whirling motion. The necessary velocities depend on the size of material used. In the size range of material preferred in this invention velocities (calculated for normal temperature and pressure) of from 2 to 100 cm./sec., preferably of from 10 to 50 cm./sec., are applied. These velocities also are sufficiently high that the gases can carry with them the light silica and silicate material not chlorinated, but still low enough that the heavier material to be chlorinated is retained in the bed. From the upper part of the agitated bed a gaseous mixture of the reaction containing predominately titanium tetrachloride vapor and carbon dioxide with only a low concentration of suspended solids is removed. If desired the suspended solids may be separated before liquid TiCl₄ is condensed.

The proportion of CO to Cl₂ in the gas mixture giving the highest yields of titanium chloride, based on the amount of either of the gases introduced, depends on the composition of the raw material and should be adjusted as to ensure the simultaneous reduction and chlorination of the oxidic values contained in the material. For the chlorination of TiO₂ according to Equation 3 theoretically about 1 volume of Cl₂ is used for 1 volume of CO, for the chlorination of FeO to FeCl₃ however 1 volume CO and 1½ volumes Cl₂ are needed. For the chlorination of raw materials rich in iron the ratio of Cl₂ to CO therefore will be maintained at a higher level than in the chlorination of titanium raw material with a high percentage of titanium and a low content of iron. To obtain a substantially complete consumption of chlorine (e. g. above 95%) which is most important for an economical production it is suitable to work wtih a gas containing CO in excess over the theoretical amount of CO. An excess of CO of 5 to 100%, preferably of 10 to 50%, ensures such a complete consumption of Cl₂. The ratio by volume of CO to Cl₂ in the chlorination gas mixture therefore for practical purposes is maintained within the range of from 1 to 2, preferably of from 1.1 to 1.5. After having separated the titanium chloride and if desired having eliminated also the CO₂ in the final gas the surplus of CO can be recycled to the chlorination operation.

Instead of a mixture of chlorine and CO also a gas containing phosgene including pure COCl₂ can be used. Phosgene dissociates at the high temperatures required for the reaction to the greatest part into CO and Cl₂ already before entering into reaction.

The clogging and agglomerating tendencies of the titanium material can be minimized to a considerable degree, if the chlorination gases, i. e. the Cl₂—CO mixture, is applied with a concentration of moisture, preferably of below 0.1% by volume.

The gaseous mixture of CO and Cl₂ used for the chlorination may be produced by mixing chlorine with CO-gas in the desired proportion. CO-gas for this purpose may be obtained by gasification of solid carbon with oxygen. The gaseous mixture can preferably be obtained also by conducting a mixture of oxygen and chlorine through a hot bed of solid carbon. In order to decrease the great amount of exothermic reaction heat developed within such a bed, it may be advantageous to add to the gaseous mixture a certain amount of CO₂ which is reduced to CO in the reaction zone. Such an admixture of CO₂ allows a good control of the temperature within the reaction zone. The production of CO can be performed also by reacting solid carbon in finely divided form in suspension within the gaseous mixture of Cl₂—O₂ and CO₂.

Preferably a carbonaceous material as dry as possible and having a very low content of hydrogen and hydrogen compounds is utilized for the production of the CO—Cl₂ mixture. If a moist carbonaceous material or a material rich in hydrogen is used, the gaseous mixture of CO and Cl₂ nevertheless will have the desired low moisture concentration. But it will contain higher amounts of hydrogen chloride, because the elemental hydrogen contained in the carbonaceous material or developed by reduction of the moisture with the carbon is converted to HCl. The chlorine bound as hydrogen chloride however will not react with the titanium oxide material and therefore will be lost. The carbonaceous material therefore preferably is freed before it is burnt to carbon monoxide from its content of water and hydrogen by calcination. A calcination of one to several hours duration at 800 to 1000° C. has been found advisable.

In the accompanying drawing an apparatus for performing the chlorination process and the preceding production of the CO—Cl₂ gas mixture is shown in a diagrammatic way. Referring to the drawing a furnace 1 is provided for the production of the Cl₂—CO gas mixture by burning solid carbonaceous material, introduced through tube 3, in suspension within a gaseous mixture of Cl₂+O₂ and, if necessary, CO₂. The gaseous mixture is fed to the furnace through conduit 2. Within the lower part of the furnace 1 a porous refractory plate is built which prevents the falling back of the carbon powder. Through conduit 5 the CO—Cl₂ gas mixture enters cyclone 6 serving for the separation of carbon dust carried with the gases and for cooling the gases. Afterwards the gases reach the chlorination furnace 7 through conduit 8. The chlorination furnace is supplied with titanium raw material in sandy or pulverulent form by tube 9. The chlorination gases passing porous plate 10 built within the lower part of the furnace maintain the titanium raw material in suspension. The products of chlorination are conducted through conduit 11 to a condensation apparatus for the produced chlorides not shown in the drawing.

It is also possible however to introduce the titanium raw material, e. g. by a screw, first into a $Cl_2$—CO gas stream having a sufficient velocity to entrain the material and to suspend it thereby into the gas. The gaseous suspension then is conducted into a reaction furnace having a diameter of sufficient cross section that the solid particles are no longer carried with the gas stream leaving the reaction furnace, but are maintained therein in a suspended bed and thereby reacted. In such a case the placing of a porous plate within the reaction furnace is not necessary.

In order to more fully illustrate the preferred embodiments of this invention the following examples are presented.

*Example 1*

A gaseous mixture consisting of 60% $Cl_2$, 10% $CO_2$ and 30% $O_2$ is conducted with a velocity of 25 cm./sec. through a bed of pulverulent petroleum coke having a height of 1 m. and being maintained within gaseous suspension within generator 1, the coke powder having a size between 110 and 180 mesh. The hydrogen content of the petroleum coke powder is decreased to less than 1% by previous calcination and the calcined petroleum coke while still hot is introduced to the bed by tube 3. The temperature within the bed is maintained at 1000 to 1100° C. The control of temperature is done by adjusting the $CO_2$—$O_2$ ratio within the entering gas. If the temperature exceeds 1100° C., the amount of $CO_2$ is increased and simultaneously the amount of oxygen decreased. If the temperature drops, the amount of oxygen is increased with a corresponding decrease of the amount of $CO_2$. A chlorination gas is obtained consisting of about 40% $Cl_2$, 50% CO, 5% $CO_2$ and 5% HCl. After elimination of the coal dust carried with the gas and cooling of the gases to about 500° C. in cyclone 6 the chlorination gas is introduced into chlorination furnace 7. Through tube 9 the chlorination furnace is charged with pulverulent titanium slag containing about 70 $TiO_2$, 12% FeO, 6% MgO, 1% CaO, 6% $Al_2O_3$, 3% $SiO_2$ and 2% of oxides of other metals, such as V, Cr, Zr, etc. The grain size of the slag should be between 100 and 200 mesh. The bed maintained in suspension has a height of about 1 m. and such a diameter that the gas velocity amounts to about 15 cm./sec. The temperature of reaction is maintained at about 1100° C. The gaseous products of reaction are conducted through the well insulated conduit 11 to the condensation system. In a first condensation zone the gases are cooled to a temperature of about 300° C. by injecting cold liquid titanium chloride. Thereby the chlorides of magnesium and calcium separate in pulverulent form and are eliminated together with the flue dust settled out. In a second condensation zone the temperature is lowered to about 150° C. by the admixture of cooled recycled chlorination gas. Thereby primarily ferric chloride separates and is eliminated. The gases then are conducted into the condensation apparatus for the titanium chloride whereby the condensation is performed by washing with cold liquid titanium chloride. Simultaneously with the titanium chloride aluminum chloride and silicium chloride are condensing. After the condensation part of the gases is recycled to the condensation zone for the ferric chloride.

*Example 2*

48 kg./h. of a well dried gas mixture containing 28% CO, 5% $COCl_2$, 20% $Cl_2$ and 47% $CO_2$ and less than 0.1% by volume of $H_2O$ are prepared. Into this gas mixture 12 kg./h. of rutile, having a grain size within the range of from 200 to 280 mesh are suspended. The gaseous suspension is introduced into a reactor having a diameter of 30 cm. and a length of 3 m. The temperature is maintained at about 1125° C. The chlorination gases leaving the tower are cooled and ferric chloride and titanium chloride are condensed. About 28 kg./h. of titanium tetrachloride are obtained. The gas leaving the $TiCl_4$ condenser contains about 10% by volume of CO and 90% of carbon dioxide with only traces of free chlorine, phosgene and hydrogen chloride. The gas mixture is fed to a $CO_2$ water-scrubber, wherein about one third of the $CO_2$ is washed out. The gas containing now 15% CO and 85% $CO_2$ then is carefully dried and admixed with more CO, $Cl_2$ and $COCl_2$ to prepare fresh gas for the chlorination having the first mentioned composition.

The practice of this invention has been exemplified herein by various details and illustrative embodiments. It will be understood, however, that the details may be varied widely and that substitutions, additions or omissions may be made without departing from the scope or spirit of the invention which is intended to be defined by the appended claims.

What is claimed is:

1. A process for the continuous production of titanium tetrachloride comprising forming an agitated bed consisting essentially only of finely divided particles of titanium oxide bearing slag free of solid carbon and substantially free of non-chloridizable solids, said slag containing 1 to 10 percent by weight of the oxides of alkaline earth metals including magnesium, said slag containing alkaline earth metal oxides that form molten chlorides tending to clog the bed at chlorination temperatures, maintaining said bed in continuous agitation by an upwardly flowing gas stream containing chlorine and containing carbon monoxide as the only reducing constituent, continuously introducing to said bed a finely divided titanium oxide bearing slag as aforesaid, maintaining said bed at a temperature above 1000° C. but not exceeding 1300° C. and sufficient to effect substantially complete chlorination of said slag through the reaction of chlorine and carbon monoxide therewith at a rate equivalent to the rate of introduction of said slag to said bed, thereby forming vaporized chlorides including titanium chloride vapor and including the chloride of the alkaline-earth metals and carbon dioxide, removing from the upper part of said bed gaseous reaction products containing said vaporized chlorides, continuously entraining and removing with said reaction products any material of said bed that is not completely chlorinated and volatilized therein, whereby said alkaline earth metal oxides in said slag are substantially completely chlorinated and volatilized as chlorides and all the chorination products are continuously removed together to prevent clogging of the bed, and condensing the vaporized chlorides.

2. A process for the continuous production of titanium tetrachloride comprising conducting a gaseous mixture containing elemental chlorine and oxygen through a hot bed of solid carbon to prepare a mixture containing chlorine and carbon monoxide, forming an agitated bed consisting essentially only of finely divided particles of titanium oxide bearing slag free of solid carbon and substantially free of non-chloridizable solids, said slag containing alkaline earth metal oxides that form molten chlorides tending to clog the bed at chlorination temperatures, maintaining said bed in continuous agitation by an upwardly flowing gas stream containing said chlorine and containing said carbon monoxide as the only reducing constituent, continuously introducing to said bed a finely divided titanium oxide bearing slag as aforesaid, maintaining said bed at a temperature above 1000° C. but not exceeding 1300° C. and sufficient to effect substantially complete chlorination of said slag through the reaction of chlorine and carbon monoxide therewith at a rate equivalent to the rate of introduction of said material to said bed, thereby forming vaporized chlorides including titanium chloride vapor, removing from the upper part of said bed gaseous reaction products containing said vaporized chlorides, continuously entraining and removing with said reaction products any material of said bed that is not completely chlorinated and volatilized therein, whereby said alkaline earth metal oxides in said slag are substantially completely chlorinated and volatilized as chlorides and all the chlorination products are continuousy removed together to prevent clogging of the bed, and condensing the vaporized chlorides.

3. A process for the continuous production of titanium tetrachloride comprising forming an agitated bed consisting essentially only of finely divided particles of titanium oxide bearing slag free of solid carbon and substantially free of non-chloridizable solids, said slag containing alkaline earth metal oxides that form molten chlorides tending to clog the bed at chlorination temperatures, maintaining said bed in continuous agitation by an upwardly flowing gas stream containing chlorine and containing carbon monoxide as the only reducing constituent, said gas stream having a moisture concentration of below 0.1 percent by volume, continuously introducing to said bed a finely divided titanium oxide bearing slag as aforesaid, maintaining said bed at a temperature above 1100° C. but not exceeding 1300° C. and sufficient to effect substantially complete chlorination of said slag through the reaction of chlorine and carbon monoxide therewith at a rate equivalent to the rate of introduction of said slag to said bed, thereby forming vaporized chlorides including titanium chloride vapor, removing from the upper part of said bed gaseous reaction products containing said vaporized chlorides, continuously entraining and removing with said reaction products any material of said bed that is not completely chlorinated and volatilized therein, whereby said alkaline earth metal oxides in said slag are substantially completely chlorinated and volatilized as chlorides and all the chlorination products are continuousy removed together to prevent clogging of the bed, and condensing the vaporized chlorides.

4. A process for the continuous production of titanium tetrachloride comprising forming an agitated bed consisting essentially only of finely divided particles of titanium oxide bearing slag free of solid carbon and substantially free of non-chloridizable solids, said slag containing alkaline earth metal oxides that form molten chlorides tending to clog the bed at chlorination temperatures, maintaining said bed in continuous agitation by an upwardly flowing gas stream containing chlorine and containing carbon monoxide as the only reducing constituent, said gas stream flowing at a velocity of 10 to 50 cm./sec, continuously introducing to said bed a finely divided titanium oxide bearing slag as aforesaid, maintaining said bed at a temperature above 1000° C. but not exceeding 1300° C. and sufficient to effect substantially complete chlorination of said slag through the reaction of chlorine and carbon monoxide therewith at a rate equivalent to the rate of introduction of said slag to said bed, thereby forming vaporized chlorides including titanium chloride vapor, removing from the upper part of said bed gaseous reaction products containing said vaporized chlorides, and continuously entraining and removing with said reaction products any material of said bed that is not completely chlorinated and volatilized therein, whereby said alkaline earth metal oxides in said slag are substantially completely chlorinated and volatilized as chlorides and all the chlorination products are continuously removed together to prevent clogging of the bed.

References Cited in the file of this patent

UNITED STATES PATENTS

| 2,184,884 | Muskat et al. | Dec. 26, 1939 |
| 2,184,885 | Muskat et al. | Dec. 26, 1939 |
| 2,245,076 | Muskat et al. | June 10, 1941 |
| 2,245,077 | Muskat et al. | June 10, 1941 |
| 2,277,220 | Gailey | Mar. 24, 1942 |
| 2,378,675 | Agnew et al. | June 19, 1945 |
| 2,401,544 | Brallier | June 4, 1946 |
| 2,486,912 | Belchetz | Nov. 1, 1949 |
| 2,555,374 | Rowe et al. | June 5, 1951 |
| 2,701,180 | Krchma | Feb. 1, 1955 |

OTHER REFERENCES

J. W. Mellor's "A Comprehensive Treatise on Inorganic and Theoretical Chemistry," vol. 7, 1927 ed., page 79, Longmans, Green & Co., New York.

Chemical Abstracts, 1938, 32, 3715.

"Titanium," by Jelks Barksdale, 1949 ed., page 33. The Ronald Press Co., New York.